(12) United States Patent
Kan

(10) Patent No.: US 8,483,782 B2
(45) Date of Patent: Jul. 9, 2013

(54) MOBILE PHONE

(75) Inventor: Chih-Wei Kan, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 187 days.

(21) Appl. No.: 13/011,945

(22) Filed: Jan. 24, 2011

(65) Prior Publication Data

US 2012/0185629 A1    Jul. 19, 2012

(30) Foreign Application Priority Data

Jan. 14, 2011 (TW) ................................. 100101330

(51) Int. Cl.
*H04M 1/00* (2006.01)
(52) U.S. Cl.
USPC ........ 455/575.2; 455/556; 455/568; 455/575; 710/300
(58) Field of Classification Search
USPC ........ 455/41.1, 41.2, 41.3, 73, 569.1, 569.55, 455/575.2; 710/300
See application file for complete search history.

(56) References Cited

U.S. PATENT DOCUMENTS

| 8,121,334 | B2 * | 2/2012 | Tsai | 381/374 |
| 2006/0229012 | A1 * | 10/2006 | Tsai et al. | 455/41.2 |
| 2011/0058319 | A1 * | 3/2011 | Kim et al. | 361/679.01 |
| 2012/0171964 | A1 * | 7/2012 | Tang et al. | 455/41.3 |

* cited by examiner

*Primary Examiner* — Edward Urban
*Assistant Examiner* — Max Mathew
(74) *Attorney, Agent, or Firm* — Altis Law Group, Inc.

(57) ABSTRACT

A mobile phone includes an earphone and a main body. The earphone includes a first universal serial bus (USB) interface, a first USB audio module connected to the first USB interface, a battery module connected to the first USB interface, a speaker module connected to the first USB audio module, a first BLUETOOTH module connected to the speaker module and the battery module, a microphone module connected to the first BLUETOOTH module, and a first antenna module connected to the first BLUETOOTH module. The main body includes a second USB interface, a second USB audio module connected to the USB interface, a control module connected to the second USB audio module, a detecting module connected to the second USB interface and the control module, a second BLUETOOTH module connected to the control module, and a second antenna module connected to the second BLUETOOTH module.

4 Claims, 6 Drawing Sheets

MOBILE PHONE

BACKGROUND

1. Technical Field

The present disclosure relates to mobile phones.

2. Description of Related Art

BLUETOOTH earphones are commonly used with mobile phones for greater convenience. However, the BLUETOOTH earphones and the mobile phones are separate devices and therefore not so convenient to carry.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
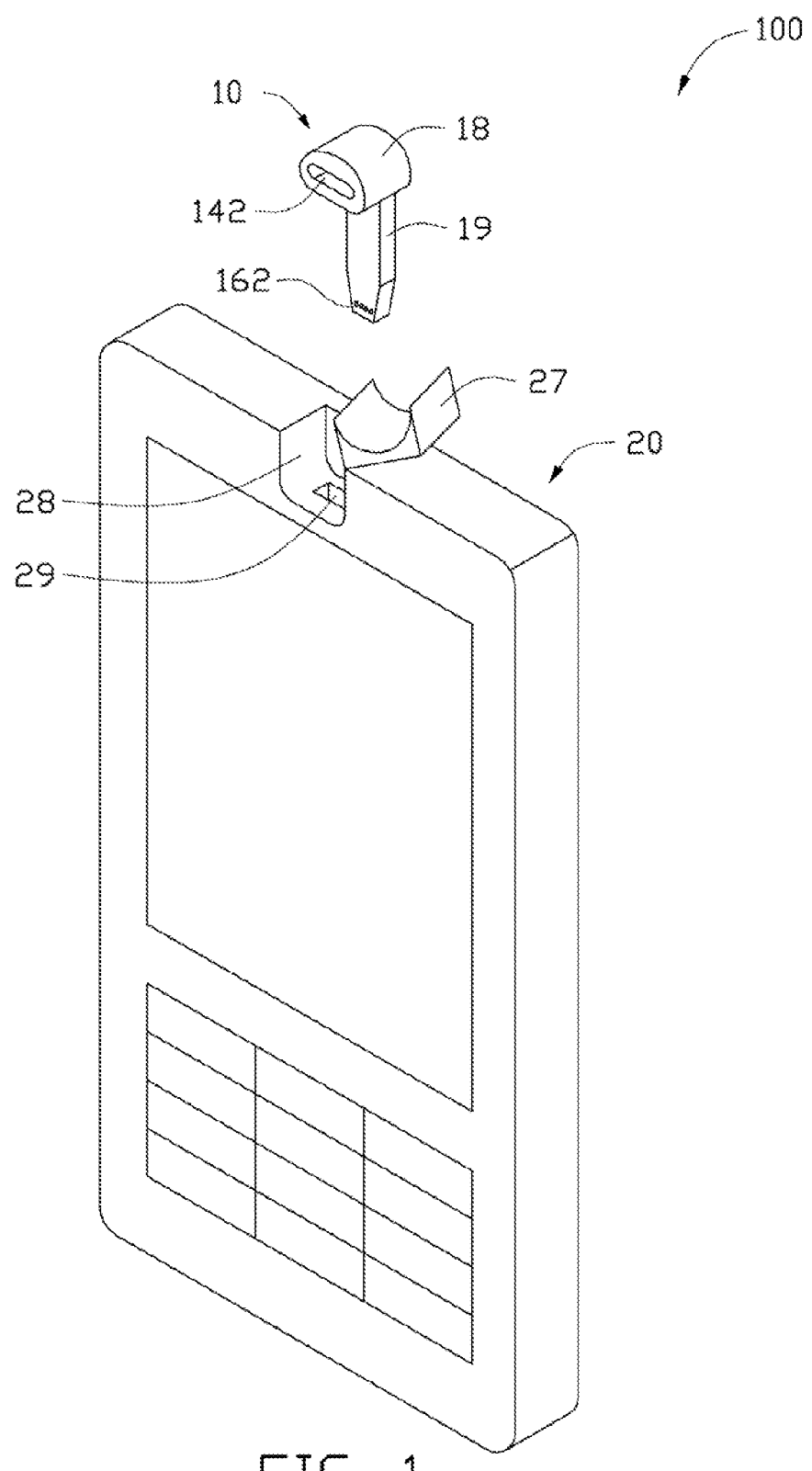
FIG. 1 is an exploded, isometric view of an embodiment of a mobile phone including an earphone and a main body.

Referring to FIG. 1, an embodiment of a mobile phone 100 includes a main body 20 and an earphone 10.

Figure 2:
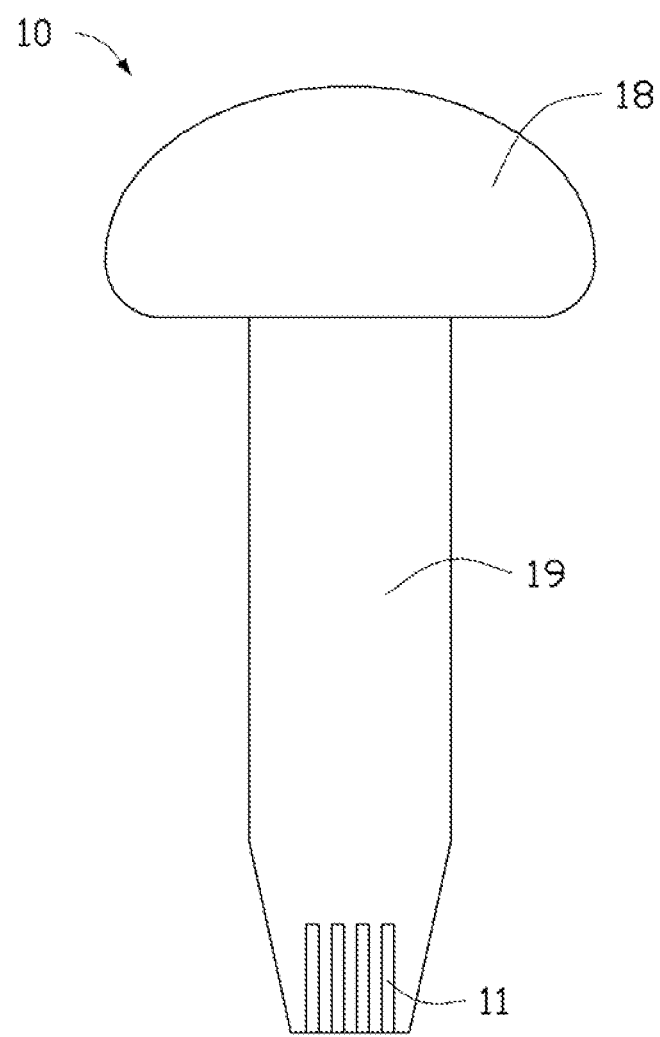
FIG. 2 is a rear plan view of the earphone of FIG. 1.

Referring to FIG. 2 also, the earphone 10 includes an earplug 18 and an inserting portion 19 extending from the earplug portion 18. In one embodiment, a hole 142 is defined in a front surface of the earplug 18. The inserting portion 19 is substantially rectangular. A plurality of holes 162 are defined in a front surface of the inserting portion 19. A universal serial bus (USB) interface 11 is mounted on a rear surface of the inserting portion 19. In other embodiments, the configuration of the earplug 18 and the inserting portion 19 can be changed according to requirements.

Figure 3:
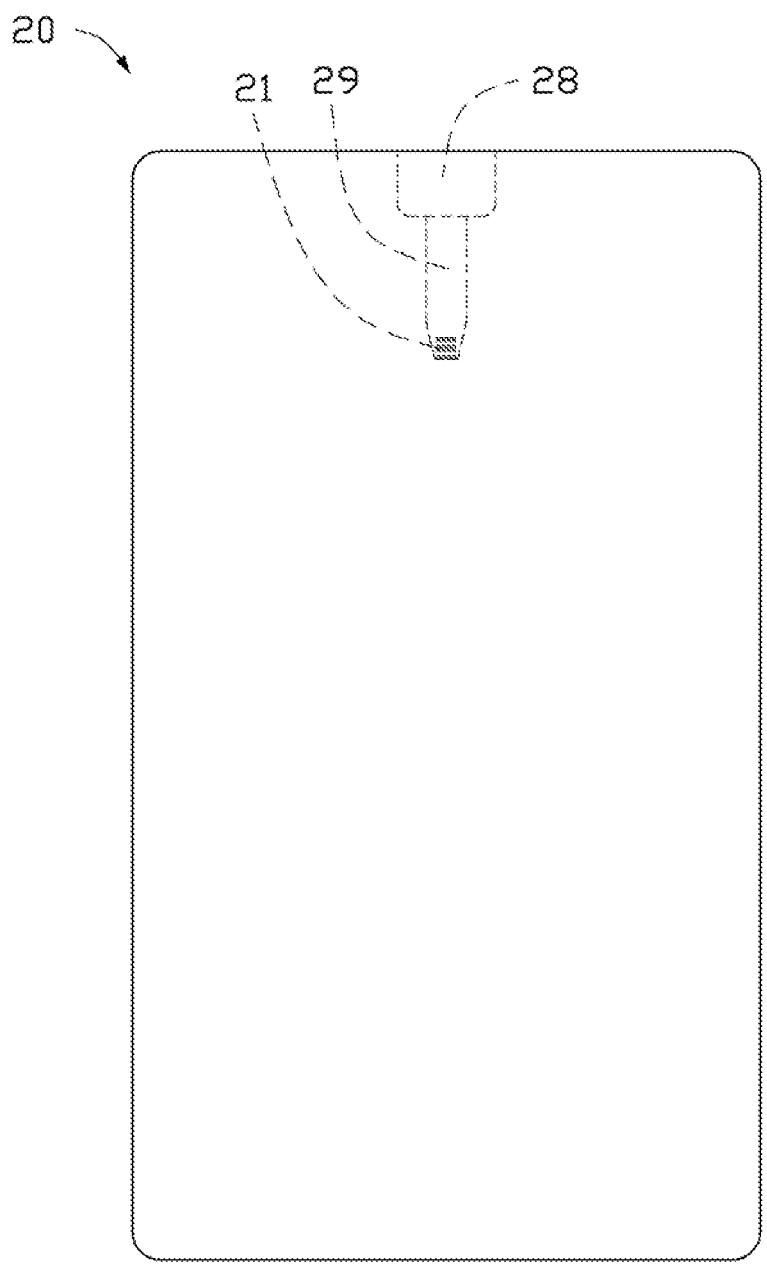
FIG. 3 is a rear plan view of the main body of FIG. 1.

Referring to FIG. 3, the main body 20 is substantially rectangular. A depressed portion 28 is defined in a top of the main body 20 for receiving the earplug 18. A mounting hole 29 is defined in a bottom of the depressed portion 28 for receiving the inserting portion 19. A cover 27 (FIG. 1) is rotatably mounted on the main body 20 for covering the earplug 18 when it is received in the depressed portion 28. A USB interface 21 is mounted on a sidewall bounding the mounting hole 29, corresponding to the USB interface 11.

Figure 4:
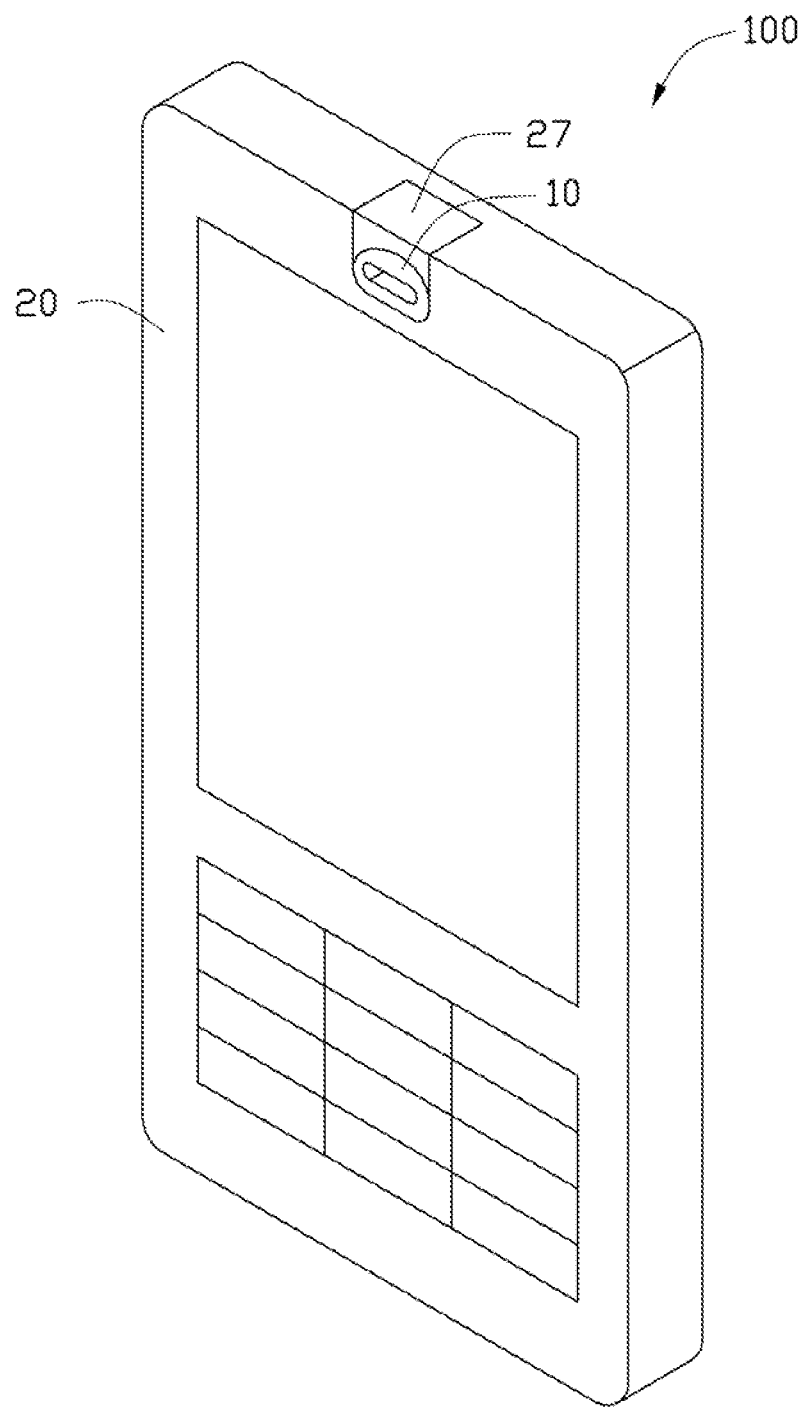
FIG. 4 is an assembled, isometric view of the mobile phone of FIG. 1.

Referring to FIG. 4, in assembly, the inserting portion 19 of the earphone 10 is inserted in the mounting hole 29 of the main body 20, and the earplug 18 is received in the depressed portion 28. At this time, the USB interface 11 of the earphone 10 is electrically connected to the USB interface 21 of the main body 20. The cover 27 is rotated to cover the earplug 18, so that the earphone 10 is retained to the main body 20.

Figure 5:
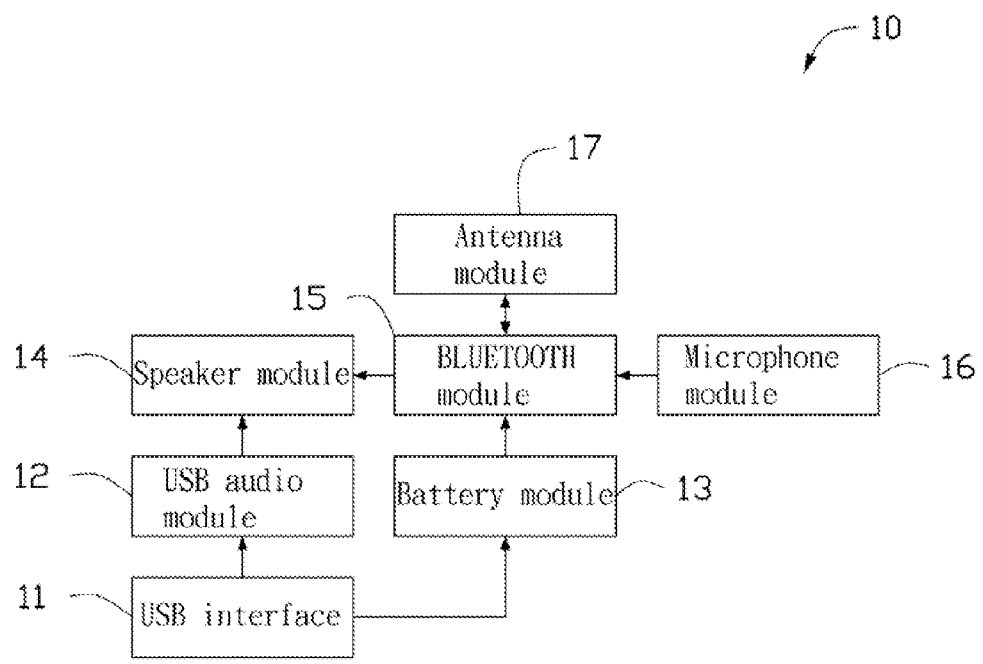
FIG. 5 is a block diagram of the earphone of FIG. 1.

Referring to FIG. 5, the earphone 10 further includes a USB audio module 12, a battery module 13, a speaker module 14, a BLUETOOTH module 15, a microphone module 16, and an antenna module 17. The speaker module 14 is connected to the USB interface 11 through the USB audio module 12, and connected to the microphone module 16 through the BLUETOOTH module 15. The hole 142 of the earplug 18 aligns with the speaker module 14, and the holes 162 of the inserting portion 19 align with the microphone module 16. The BLUETOOTH module 15 is connected to the USB interface 11 through the battery module 13. The antenna module 17 is connected to the BLUETOOTH module 15.

Figure 6:
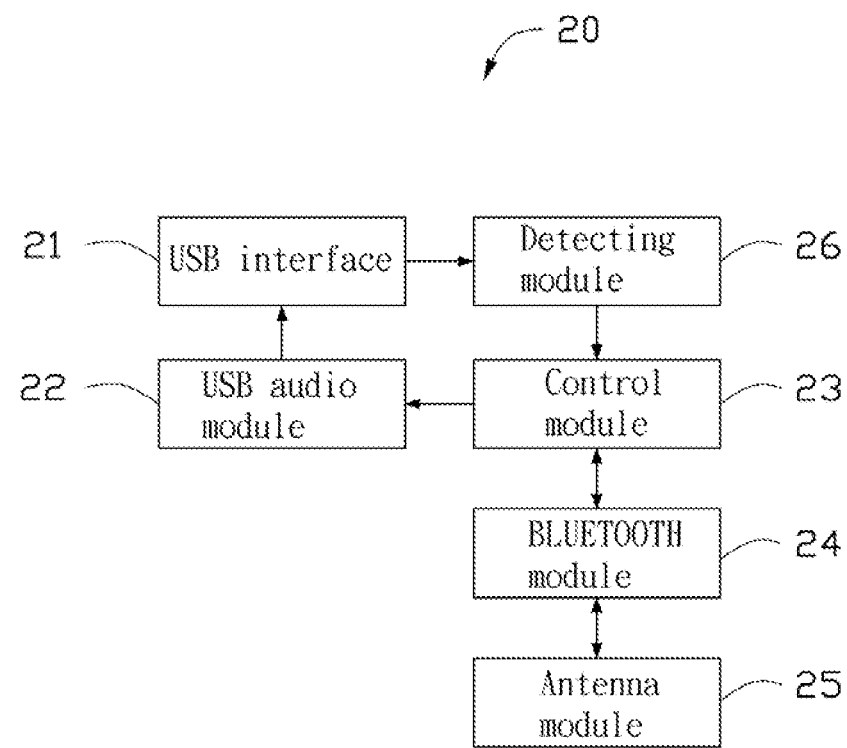
FIG. 6 is a block diagram of the main body of FIG. 1.

Referring to FIG. 6, the main body 20 further includes a USB audio module 22, a control module 23, a BLUETOOTH module 24, an antenna module 25, and a detecting module 26. The control module 23 is connected to the USB interface 21 through the USB audio module 22, connected to the USB interface 21 through the detecting module 26, and connected to the antenna module 25.

When the earphone 10 is inserted in the main body 20, the detecting module 26 detects that the USB interface 11 is electrically connected to the USB interface 21. The detecting module 26 sends a first control signal to the control module 23. The control module 23 controls the USB audio module 22 to work according to the first control signal. Therefore, the USB audio module 22 can communicate with the USB audio module 12 through the USB interfaces 11 and 21. Namely, the main body 20 can control the speaker module 14 through the USB audio modules 22 and 12. In this working state, the mobile phone 100 works as an ordinary mobile phone. Meanwhile, the battery module 13 is charged by power pins of the USB interfaces 11 and 12.

When the earphone 10 is pulled out from the main body 20, the detecting module 26 detects that the USB interface 11 is not electrically connected to the USB interface 21. The detecting module 26 sends a second control signal to the control module 23. The control module 23 controls the BLUETOOTH module 24 to work according to the second control signal. Therefore, the BLUETOOTH module 24 can communicate with the BLUETOOTH module 15 through the antenna modules 25 and 17. Namely, the main body 20 can control the speaker module 14 and the microphone module 16 through the BLUETOOTH modules 24 and 15. In this working state, the mobile phone 100 works as a BLUETOOTH mobile phone, the battery module 13 supplies power to the BLUETOOTH module 15. If the BLUETOOTH module 15 has no power to work, the earphone 10 can be inserted in the main body 20 allowing the battery module 13 to be charged by the power pins of the USB interfaces 11 and 21 again, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A mobile phone comprising:
    an earphone comprising:
        a first universal serial bus (USB) interface located on an inserting portion;
        a first USB audio module connected to the first USB interface;
        a battery module connected to the first USB interface;

a speaker module connected to the first USB audio module;
a first BLUETOOTH module connected to the speaker module and the battery module, wherein the battery module supplies power to the first BLUTOOTH module;
a microphone module connected to the first BLUETOOTH module; and
a first antenna module connected to the first BLUETOOTH module; and a main body comprising:
a second USB interface;
a second USB audio module connected to the second USB interface;
a control module connected to the second USB audio module;
a detecting module connected to the second USB interface and the control module;
a second BLUETOOTH module connected to the control module; and
a second antenna module connected to the second BLUETOOTH module;
wherein the earphone is detachably mounted to the main body to selectively electrically connect or disconnect the first USB interface to or from the second USB interface, the detecting module outputs a first control signal to the control module in response to the first USB interface being electrically connected to the second USB interface, the control module controls the second USB audio module to communicate with the first USB audio module through the first and second USB interfaces according to the first control signal, the battery module is charged by the first and second USB interfaces; and
wherein the detecting module outputs a second control signal to the control module in response to the first USB interface being disconnected from the second USB interface, the control module controls the second BLUETOOTH module to communicate with the first BLUETOOTH module through the first and second antenna modules according to the second control signal; and
wherein the earphone further comprises an earplug and said inserting portion extending from the earplug, the main body defines a depressed portion for receiving the earplug, and defines a mounting hole in a bottom of the depressed portion for receiving the inserting portion.

2. The mobile phone of claim 1, wherein the first USB interface is mounted on a rear surface of the inserting portion, the second USB interface is mounted on a sidewall bounding the mounting hole.

3. The mobile phone of claim 2, wherein the main body further comprises a cover rotatably mounted to the main body for covering the depressed portion.

4. The mobile phone of claim 1, wherein a front surface of the earplug defines a first hole aligning with the speaker module, a front surface of the inserting portion defines a plurality of second holes aligned with the microphone module.

* * * * *